United States Patent
Krebser

(10) Patent No.: US 9,937,574 B2
(45) Date of Patent: Apr. 10, 2018

(54) METHOD OF MACHINING A WORKPIECE, AND GEAR-CUTTING MACHINE OPERABLE TO PERFORM THE METHOD

(71) Applicant: GLEASON-PFAUTER MASCHINENFABRIK GMBH, Ludwigsburg (DE)

(72) Inventor: Gerhard Krebser, Affalterbach (DE)

(73) Assignee: GLEASON-PFAUTER MASCHINENFABRIK GMBH, Ludwigsburg (DE)

( * ) Notice: Subject to any disclaimer, the term of this patent is extended or adjusted under 35 U.S.C. 154(b) by 688 days.

(21) Appl. No.: 14/408,406

(22) PCT Filed: Jun. 17, 2013

(86) PCT No.: PCT/EP2013/001789
§ 371 (c)(1),
(2) Date: Dec. 16, 2014

(87) PCT Pub. No.: WO2014/000870
PCT Pub. Date: Jan. 3, 2014

(65) Prior Publication Data
US 2015/0165533 A1 Jun. 18, 2015

(30) Foreign Application Priority Data
Jun. 25, 2012 (DE) .................. 10 2012 012 559

(51) Int. Cl.
*B23F 19/10* (2006.01)
*B23F 23/04* (2006.01)
(Continued)

(52) U.S. Cl.
CPC ............. *B23F 19/10* (2013.01); *B21H 5/022* (2013.01); *B21H 5/045* (2013.01); *B23F 17/006* (2013.01);
(Continued)

(58) Field of Classification Search
CPC . Y10T 409/100795; Y10T 409/101113; Y10T 409/101272; Y10T 409/100954;
(Continued)

(56) References Cited

U.S. PATENT DOCUMENTS

| 2,107,543 A * | 2/1938 | Miller | .................. B23F 5/166 29/38 A |
| 2,585,271 A * | 2/1952 | Praeg | .................. B21H 5/022 29/38 A |

(Continued)

FOREIGN PATENT DOCUMENTS

| DE | 102009018405 A1 | 10/2010 |
| EP | 1270127 A1 | 1/2003 |

(Continued)

OTHER PUBLICATIONS

International Search Report and Written Opinion for PCT/EP2013/001789 dated Oct. 22, 2013.
(Continued)

*Primary Examiner* — Erica E Cadugan
(74) *Attorney, Agent, or Firm* — Robert L. McDowell

(57) ABSTRACT

The invention concerns a method of machining a workpiece, wherein an end-facing tooth edge of a gear profile of the workpiece that was generated by a chip-removing machining process is reworked at a first location into a chamfered edge by way of a plastic forming operation. The material which in the plastic forming operation was displaced towards the end surface of the gear profile is pushed outward as a material protrusion in the end surface of the tooth, while the material displaced towards the flank of the tooth is pushed outward as a material protrusion on the flank side of the chamfer, and the resulting material protrusions in the end surface and on the flank side are removed. The workpiece, while still carrying the material protrusion on the end surface of the gear profile, is transferred to a second location (Continued)

Figure 1:
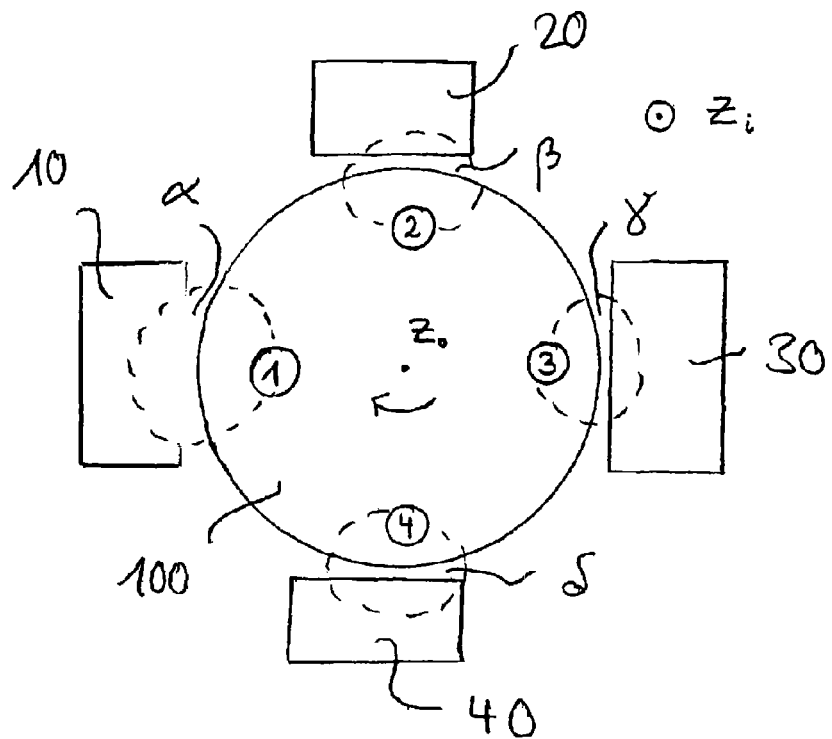

where the protrusion on the flank side of the chamfer is removed.

14 Claims, 2 Drawing Sheets

(51) Int. Cl.
*B23F 17/00* (2006.01)
*B23F 5/22* (2006.01)
*B21H 5/02* (2006.01)
*B21H 5/04* (2006.01)

(52) U.S. Cl.
CPC ............ *B23F 17/008* (2013.01); *B23F 23/04* (2013.01); *B23F 5/22* (2013.01); *Y10T 29/49476* (2015.01); *Y10T 409/10159* (2015.01); *Y10T 409/100795* (2015.01); *Y10T 409/101113* (2015.01); *Y10T 409/101749* (2015.01); *Y10T 409/107632* (2015.01)

(58) Field of Classification Search
CPC ...... B23F 17/006; B23F 17/008; B23F 23/02; B23F 23/04; B23F 19/10–19/125
USPC ................ 409/1–62; 29/38 A, 38 B, 38 R
See application file for complete search history.

(56) References Cited

U.S. PATENT DOCUMENTS 2,585,272 A * 2/1952 Praeg ...................... B23F 23/12
29/38 A
2009/0238654 A1* 9/2009 Jaeger .................. B23F 17/006
409/12

FOREIGN PATENT DOCUMENTS

EP          2066473 B1    10/2010
WO     2010-079113 A2     7/2010

OTHER PUBLICATIONS

"Chamfering and Deburring External Parallel Axis Gears", Nyamagoudar, B., Gear Technology, vol. 13, No. 6, Nov./Dec. 1996, pp. 25-31.

* cited by examiner

METHOD OF MACHINING A WORKPIECE, AND GEAR-CUTTING MACHINE OPERABLE TO PERFORM THE METHOD

The invention concerns a method of machining a workpiece, wherein the edge at the end of a tooth flank of a gear profile which has been formed on the workpiece by a chip-removing machining process is changed by way of a plastic forming operation into a chamfered edge, wherein the material displaced towards the end face of the gear profile in the plastic forming operation is pushed outward as an end-facing material protrusion, while the material displaced towards the tooth flank of the gear profile is pushed outward as a material protrusion in the tooth flank, and wherein the resulting material protrusions in the end face and in the flank are removed by the machining method. In addition, the invention also concerns a gear-cutting machine of a suitable design and with the requisite control capabilities to perform the method.

Methods of this kind belong to the known state of the art which includes for example EP 1 270 127 A1. Thus, there are a number of reasons for removing the burr which occurs at the edge at the end of a tooth flank as a result of chip-cutting machining operations. These reasons, which are familiar to practitioners, are summarized for example in the introductory paragraphs of DE 10 2009 018 405 A1, which is hereby named as a reference. But in addition to burrs caused by cutting operations, the material protrusions or ridges produced in the plastic forming of the tooth edge, also referred to in the literature as secondary burrs, likewise prove to be disadvantageous for the further work operations on the gear profile, and they are therefore also normally removed.

To remove these secondary burrs, it has been proposed for example in EP 1 270 127 A1 to smooth out the protrusion (secondary burr) in the tooth flank through subsequent pressure-rolling. In DE 10 2009 018 405 A1, on the other hand, it is proposed to remove the secondary burr in the tooth flank through the cutting action resulting from the tooth engagement of a tool wheel that carries a cutting edge on a tooth flank.

In regard to the tools for the plastic reshaping of the tooth edge into a chamfer, the state of the art offers tools and methods whereby the ridge thrown up at the end surface (end-facing secondary burr) can be removed simultaneously with the reshaping itself by using a chamfering disk and a cutting tool together, in particular combined as an integral tool. Using such integrated tools, which are disclosed for example in EP 2 066 473 B1, not only can the overall design of the machine tool be simplified, but also the total machining time for the work piece can be reduced.

The present invention has the objective to provide a high surface quality of the tooth flanks particularly in the area of the tooth edges which are reshaped by the method described above.

From a method-oriented point of view, this objective is met by the invention through a further development of the work process described hereinabove, wherein the improvement essentially entails the concept that the workpiece, while still carrying the end-facing material protrusion, is transferred to a second location where the removal of the protrusion on the flank side of the chamfer is performed.

Based on this procedural arrangement according to the invention, the workpiece leaves the first location with the tooth edge already reworked into a chamfer, but still carrying the material protrusions (secondary burrs) pushed up on the end-facing side and the flank side of the chamfer as a result of the plastic forming operation. In the course of the invention, it was found that while the dwell time of the workpiece at the first location is minimized when the forming of the chamfer on the tooth edge is combined with the simultaneous cutting of the end-facing material protrusion, this entails the risk that material which is already beginning to cold-harden as it is being cut off the end surface enters into the working zone of the reshaping tool and, as a result, is pressed in several places into the cold-hardened partially chamfered tooth flank, whereby the surface quality of the tooth flank is compromised at the affected locations.

By performing the method in the order prescribed by the invention, this risk is completely eliminated, as the reshaping of the tooth edge into the chamfer is already completed before the protrusions on the end surface are removed. Also, the workpiece can quickly be moved out of the first location for further processing.

Furthermore, the method according to the invention eliminates the situation where the reshaping of the tooth edge in the first location is necessarily accompanied by a stream of chips which requires expensive chip-removal measures particularly in cases where the workpiece axis is oriented vertically.

The expressions incorporating the words "tooth" or "gear" used herein refer to any kind of internally or externally toothed profile. In particular, such toothed profiles can be cylindrical or conical.

Concerning the removal of the material protrusion on the flank side, there are several conceivable possibilities. With particular preference, this operation is performed through a chip-cutting engagement of a machining tool.

In principle, the method can be used for workpieces which already have the gear profile with the tooth edge that is to be reworked. However, the machining of the gear profile itself from a workpiece blank or from a rough-machined gear profile can be a preliminary step of the method. In this case, it is specifically envisioned that the gear profile with the tooth edge that is to be reworked is machined in a third location, wherein in particular the third location coincides with the second location.

If the third location does not coincide with the second location, the latter itself being different from the first location, then the third location nevertheless is preferably a location other than the first location. This creates the conditions that also allow several work pieces to be processed in parallel.

In a particularly preferred version of the method, the gear profile with the tooth edge that is to be subsequently reworked is produced through a chip-cutting engagement between the tool and the workpiece, in particular a cutting engagement of the same kind as is used for the removal of the material protrusion and employing in particular the same tool. For example, if the gear profile of the workpiece is generated by hobbing with the required machine axes and their prescribed settings, the machine axes and their settings for the hobbing process are also used for the removal of the material protrusion on the flank side. The tool itself could be different, so that the generation of the gear profile with the tooth edge that is to be reworked is performed by a rough-cutting tool, and the removal of the material protrusion on the flank side is performed by a finishing tool. However, in a particularly simple version of the method, the same machining tool is used.

In principle, two variations of the method are conceivable. Under a first variant of the method, the operation of removing the material protrusion on the flank side relies on the assumption that the generated gear profile with the tooth edge to be reworked already conforms to the desired geometry of the tooth flanks, so that in the removal of the protrusion on the flank side essentially nothing but the protruding material is removed and no further cutting engagement takes place in other parts of the tooth flank. The infeed depth for the removal of the material protrusion on the flank side is thus the same as the deepest infeed setting for the generation of the gear profile with the tooth edge that is to be reworked.

Under another variant of the method however, the infeed depth for the removal of the material protrusion on the flank side is set deeper than the maximum infeed in the generation of the tooth. Thus, even after the gear profile has been generated, additional material is removed from the entire tooth flank, for example in a finishing step. This last operation does not produce a new primary burr which would require another reworking of the edge.

Several kinds of machining processes are conceivable for generating the gear profile with the tooth edge that is to be reworked. However, the preferred choice is hobbing, which is distinguished by short machining times, particularly if the method is used in the parallel processing of two or more workpieces.

In a preferred version of the method, which has the purpose of limiting the amount of material that is subjected to plastic forming in the reworking of the tooth edge, material is removed at least from an end surface of the generated gear profile, in particular from a lower end surface, already prior to the reworking of the tooth edge and in particular at the third location. Particularly if the workpiece axis is oriented vertically, it is a preferred practice at least at the lower end surface to remove material protruding axially beyond the end surface already prior to the reworking of the tooth edge. Depending on the design of the machine tool, the same operation could also be performed at the upper end surface. On the other hand, considering that the effect will be smaller than at the lower end surface, one dismisses the option of an advance removal of material from the upper end surface in favor of gaining a broader range of possibilities in the constructive implementation of the method. The removal of material can be performed through a shaving operation with a cutting tool, wherein the latter itself is not being driven. On the other hand, it is also conceivable to arrange a large number of small geometrically defined cutting edges on the cutting tool and to use a driven tool.

The same machining tools, or tools of the same or a similar design, can also be used for removing the pushed-out material protruding from the end surface. Thus, it is being envisioned in a version of the method, that the removal of the end-facing material protrusion on at least one end surface is performed at the second location, in particular through a shaving operation with a cutting tool, or with a driven cutting tool of the kind of a face-milling cutter. Thus, if both end surfaces of the workpiece are machined in this way, all of the chips generated in this work operation can be collected while the workpiece is at the second location. If the cutting operation is performed for example only at the lower end surface (with vertical orientation of the rotary axis of the workpiece), at least a part of the chips generated in the removal of the end-facing protrusion can be collected at the second location. If the second location and the third location are identical, the generation of chips is thus mostly or even entirely concentrated at the second location. This simplifies the design measures that are required for the disposal of the chips.

In an additional preferred step of the method, it is envisioned, after the material protrusion on the flank side has been removed, to move the workpiece to a fourth location, where the workpiece is taken off the machine tool. This can be advantageous if there is not enough space available at the second location to allow access for a workpiece changer, or if the change of the workpiece in any event has to take place at another location, in particular for a suitable organization of the process if several workpieces are machined in parallel. After taking the workpiece off, which includes unclamping the workpiece from the associated workpiece spindle, a new workpiece can be clamped to the same workpiece spindle.

In a further version of the method, the removal of the end-facing material protrusion on at least one end surface, in particular on both surfaces, can be performed at a fourth location, in particular as the last operation before taking the workpiece off the machine. This provides more freedom for the design and arrangement of the machining tools as well as their support structures at the second location. In particular under a variation of the method that is likewise considered advantageous, even if suitable machining tools for the removal of the end-facing protrusions are present at the second location for the purpose of removing axial projections prior to reworking the tooth edge, the removal of the end-facing material protrusions is not performed by those tools, but rather (by other suitable machining tools) at the fourth location. This ensures that degradations of the machining tool from the operation of removing axial projections prior to the forming of the chamfer are not transmitted back to the workpiece after the formation of the chamfer, so that as a result the surface quality of the workpiece in the area of the chamfer is further improved. As a machining tool, one could again use, for example, a shaving cutter or also a driven face-milling cutter tool.

As indicated previously herein, the method according to the invention is particularly well suited for the parallel machining of a plurality of workpieces. In particular, one could envision that while the tooth edge of a first workpiece is reworked at the first location, a gear profile of a further workpiece (whose tooth edge is to be reworked subsequently) is being generated at the third location.

In addition, the further workpiece can in particular, with a time shift, pass through the same machining steps at the same locations as the first workpiece (which, in the foregoing versions of the method, was treated as the only workpiece in process) and furthermore, a yet additional, third workpiece can be introduced into the machining process at the fourth location, while the further workpiece is at the second location.

For example, if the third location according to the method is different from the second location and the fourth location is different from the first location, a corresponding gear-cutting machine would have at least four workpiece spindles and would be capable to machine at least four workpieces in parallel. As an example, a first workpiece in the form of a blank could be clamped to a workpiece spindle at a workpiece-changing position (fourth location). Through a suitable transport movement of its carrier, this workpiece spindle is brought to a pre-milling position (third location) where, for example, the gear profile with the tooth edge that will subsequently be reworked is generated by a hobbing operation. Next, the first workpiece is brought to a chamfering station (first location) where the reworking of the tooth edge takes place. The first workpiece leaves the chamfering location with the end-facing material protrusion still in place and is brought to a fine-milling station (second location), where for example a fine-milling operation takes place with a hobbing tool which also removes the end-facing material protrusions in the same fine-milling operation. The workpiece is subsequently returned from the fine-milling station to the workpiece-changing position, where the workpiece is taken out and a new workpiece is clamped to the workpiece spindle.

In this version of the method, a second workpiece can be clamped to a second workpiece spindle which is in particular supported by the same carrier, while the first workpiece is being pre-milled. While the first workpiece is in the chamfering position, the second workpiece is pre-milled in the pre-milling position, and a third workpiece is clamped to a third workpiece spindle in the workpiece-changing position.

During the fine-milling of the first workpiece in the fine-milling position, the second workpiece is in the chamfering position, the third workpiece is being pre-milled, and a fourth workpiece is being clamped to a fourth workpiece spindle in the workpiece-changing position. In this variant of the method with four workpiece spindles, the removal of the end-facing material protrusions takes place either in the fine-milling position (at the second location) or in the workpiece-changing position prior to taking out the workpiece (at the fourth location).

If the inventive method of parallel processing is carried out by using for example two workpiece spindles, one would let the third location coincide with the second location and the fourth location with the first location. As a result, one obtains one machining position where the gear profile with the tooth edge that is to be reworked is generated for example with a hobbing tool and where the removal of the material protrusions on the flank side takes place. The other machining position is used for reworking the tooth edge into a chamfer and for the exchange of the workpiece. Thus, every workpiece is moved twice from the workpiece-changing position to the milling position and back, before it is replaced with a new workpiece. In this version of the method, if the removal of the end-facing material protrusions is performed only in the milling position, no chips are produced in the workpiece-changing position. However, for the reasons explained above, it can nevertheless be advantageous if the removal of the end-facing material protrusions is performed in the workpiece-changing position and prior to taking the workpiece out of the machine. This is a particularly preferred version of the method, as the technical complexity of the gear-cutting machine is reduced (only two workpiece spindles).

In this context, one could envision that in the fourth location, which coincides here with the first location, a space that accommodates a device for removing the workpiece and/or delivering a new workpiece overlaps with the space used for a device for the removal of end-facing material protrusions. This be realized for example with an arrangement where a tool that is not connected to a carrier of the workpiece spindle shafts and is designed to be movable relative to the workpiece occupying that location is advanced into a machining position for the removal of the end-facing material protrusions and is subsequently returned to a retracted position in order to make room for a workpiece changer to move into action.

From a device-oriented point of view, the invention provides a gear-cutting machine for the generating and/or finishing of gear profiles, wherein the gear-cutting machine includes: carrier that is movable between at least two positions and supports at least one workpiece spindle which is connected to a rotary drive source; a device for the reworking of an end-facing tooth edge of a gear profile of a workpiece that is clamped to the workpiece spindle and is positioned in a place defined by a position occupied by the carrier; and a control device directing at least the movement of the carrier, wherein the control device directs the movement Of the carrier into another position, if the workpiece still has the end-facing protrusion resulting from the displacement of material towards the end surface of the toothed profile which occurs in the reworking operation.

The advantages of the machine according to the invention derive from the advantages of the inventive method as described hereinabove. It is envisioned in particular that the gear-cutting machine includes a tool spindle that is connected to a rotary drive source and designed to hold a tool, specifically a hobbing tool which serves to generate the gear profile on the workpiece which is held by a clamp and positioned at a location defined by the at least one other position occupied by the carrier.

The machine can further include a device, specifically in the form of a non-driven shaving cutter or a driven tool such as a kind of face-milling cutter, to remove material from at least one or both of the end surfaces of the gear profile at the location that is determined by one and/or the other of the carrier positions.

In view of the advantages of performing work operations in parallel, the gear-cutting machine can be equipped with at least one further workpiece spindle that is rotatably supported on the carrier and connected to a drive source, wherein of the two workpieces clamped on two spindles one is at a first location while the other is at a second location, and wherein the positions of the two workpieces can be switched through a movement, in particular a rotation, of the carrier.

In a particularly preferred embodiment, the device for the reworking of an end-facing tooth edge and the device for the removal of axial projections and/or end-facing material protrusions is movably supported with a component of linear mobility parallel to the workpiece axis, with the ability to operate at different working heights (assuming a vertical orientation of the workpiece axis) and in particular to work on gear profiles of workpieces that have the form of a rotary shaft. This concept of supporting a chamfering tool with mobility parallel to the rotary axis of the workpiece, in combination with a revolving carrier holding one, two, or more workpiece spindles is being disclosed here as a subject that is in itself worthy of protection, independent of the nature and sequential order of the chamfering and deburring processes.

As a further facet of the invention, the controller of the gear-cutting machine is designed and operable to govern the machine tool in performing a method in accordance with one of the aspects of the method explained hereinabove.

Figure 2:
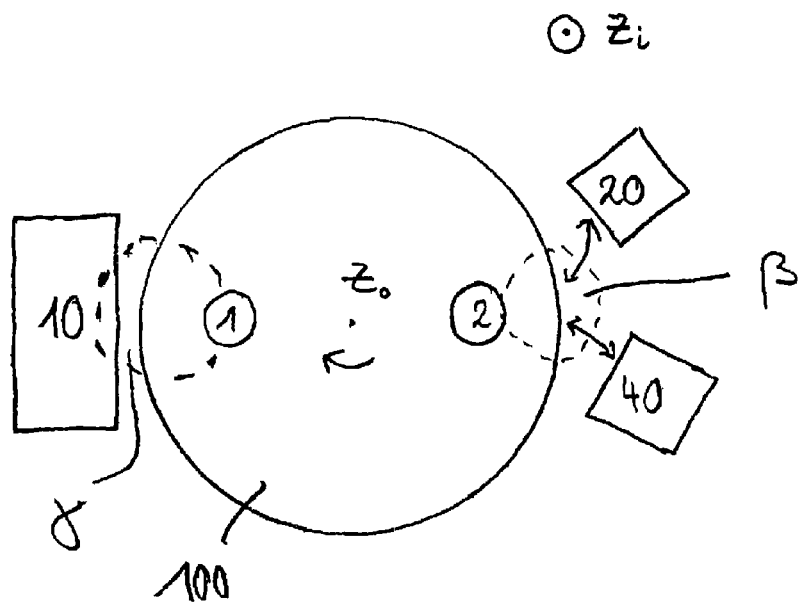

Further details, distinguishing features and advantages of the invention will become evident from the following description which refers to the attached drawings, wherein FIG. 1 schematically illustrates the method according to the invention in a first version with four different operating locations, and FIG. 2 schematically illustrates the method according to the invention with only two operating locations.

The upper part of FIG. 1 shows a schematic top view of a carrier 100 which is rotatable about its vertical rotary axis $Z_0$. The carrier 100 supports four rotatable driven workpiece spindles 1, 2, 3 and 4 spaced at equal angles from each other. Thus, when the carrier 100 is turned by 90°, each workpiece spindle moves to the position which was previously occupied by the spindle preceding it in the direction of the rotation. For example, when the carrier 100 is turned by 90° in the direction indicated in FIG. 1, the workpiece spindle 1 takes the position that was previously occupied by the workpiece spindle 2. The carrier 100 in this example can thus take on four different operating positions, i.e. the position shown in FIG. 1 and three further positions rotated from the position of FIG. 1 by 90°, 180° and 270°, respectively.

In the rotary position of the carrier 100 that is shown in FIG. 1, a processing position α is given, where a workpiece clamped to the workpiece spindle 1 can be processed at a schematically illustrated operating station 10. In this example, the operating station 10 is equipped with a hobbing tool which can generate a gear profile on the clamped workpiece in accordance with prescribed parameters. The processing position α is thus assigned to the operating station 10. Also at the operating station 10, a cutting tool is arranged which removes from the lower end surface of the workpiece the material projecting axially as a result of the hobbing process, for example through a shaving operation with a cutting tool. However, a driven rotating tool resembling a face-milling cutter can likewise be used for this purpose. In the foregoing representation, the processing position α corresponds to the third location.

In a further processing position β, a workpiece which, in the operating position of the carrier 100 as shown in FIG. 1, is seated on the workpiece spindle 2 can be worked on by an operating station 20. The operating station 20 is equipped with a chamfering tool, for example a chamfering wheel, whereby the tooth edges of the gear profile that was generated at the processing position α are converted into a chamfer. The chamfer is produced by a plastic displacement which causes material protrusions, referred to as secondary burrs, to be pushed outward on the axially facing side as well as on the flank side of the chamfer.

In a yet further processing position γ, a further operating station 30 is available to process the workpiece which, in the operating position of the carrier 100 as shown in FIG. 1, is seated on the workpiece spindle 3. The operating station 30 is likewise equipped with a hobbing tool which removes the material protrusions (secondary burrs) on the flank side in a single pass. This can be part of a finishing pass in which additional material is removed over the entire flank of the gear profile that was generated in the processing position α. However, one could also select the same infeed depth as for the hobbing tool at the operating station 10, so that in essence only the material protrusions on the flank side are being removed. Furthermore, the operating station 30 in this example is also equipped with cutting tools to remove the material protrusions (secondary burrs) on the end surface. This step can again be performed, e.g., through a simple shaving operation, or with cutting tools of the same kind as a face-milling cutter, performing their own, driven movement.

In this example, a workpiece that has gone through the operating stations α, β, γ is thus completed in regard to the soft machining operations and, after the next change of the working position of the carrier 100 to a further location δ, the workpiece can be taken out by a workpiece changer 40, whereupon a new workpiece blank can be clamped to the workpiece spindle that is currently at the location δ (i.e. the workpiece spindle 4 in the representation of FIG. 1). In this example, no actual work is performed on the workpiece at location δ. However, the removal of the end-facing material protrusions (secondary burrs) could also be changed from the processing position γ to the processing position δ.

The position δ according to the nomenclature introduced above thus corresponds to the fourth location, while the processing position β corresponds to the first location, and the processing position γ corresponds to the second location.

The passage of individual workpieces A, B, C, D, E, F through the processing positions α, β, γ, δ is represented schematically in the lower half of FIG. 1. According to the first two rows of this tabulation, a workpiece B is being installed by the workpiece changer 40 on the fourth workpiece spindle 4, while a workpiece A has already been installed on the first workpiece spindle 1 before a 90° turn of the work table 100. Accordingly, the workpiece A is currently in the processing position α.

The machining method will now be described for the newly set up workpiece (workpiece blank) B which, in its installed state on the workpiece spindle 4, is going to pass through the processing positions α, β, γ. The changes between the working positions of the rotary carrier 100 are indicated in the lower part of the tabulation in FIG. 1 by circular arrows that are marked "+π/2". In addition, an arrow marked "t" is shown in FIG. 1 to indicate the flow of time, while the reference symbol $Z_i$ in the upper part of FIG. 1 indicates the vertical orientation of the individual workpiece spindle axes.

After the next step of the turntable 100 to change to the next working position by performing a 90° turn, the workpiece B which is clamped to the workpiece spindle 4 is in the processing position α, where the gear profile is generated by means of a bobbing operation. Further, material projecting from the lower end surface of the generated gear profile is removed as described above.

With the text step of the turntable 100, the workpiece B which now carries the gear profile arrives at the processing position β. At this location, the tooth edges of the gear profile are being chamfered, whereby secondary burrs are produced on both sides of the chamfer, i.e. on the side of the end surface as well as on the flank side.

The continuation of the process is now controlled so that the workpiece B steps ahead to the processing position γ while still carrying the material protrusions (secondary burrs) on the end surface as well as on the flanks of the gear profile. Thus, at least as far as the workpiece B is concerned, the step advance can take place already after the chamfering, i.e. clearly faster than if a deburring operation for the secondary burrs were to be performed directly after the machining operation, i.e. still in the processing position β. At the same time, this avoids the risk which exists when the secondary deburring is performed in parallel with the chamfering operation, i.e. the risk that the cold-hardened material that has been cut from the end surface could be pressed into the cold-hardened partially chamfered flank edge.

Accordingly, the operation of removing the end-facing secondary burrs is uncoupled from the chamfering itself and, as described above, takes place in this example at the processing position γ or, possibly, at the position δ. At the processing position γ, the operating station 30 removes the secondary burr on the flank side through the operation described above.

After another step movement, the workpiece returns to the position δ, where the end-facing secondary burrs can be removed if this operation has not already taken place at the processing position γ, and where the workpiece is taken out by the workpiece changer 40 and replaced by a new workpiece blank F.

As the tabulation in the lower half of FIG. 1 further illustrates, workpiece A on spindle 1—one step ahead in the process sequence—undergoes the same operations at the respective positions α, β, γ, δ as the workpiece B which has just been described to illustrate the method. As is further evident, a workpiece C is processed running one step behind workpiece B, a workpiece D is processed running two steps behind workpiece B, etc. Of course, the turntable 100 is stepped ahead only after the respective work operation at every one of the operating stations α, β, γ as well as the workpiece exchange at 5 has been completed. The indexing (centering) which is necessary for the hobbing operation can take place at the location δ immediately after the workpiece exchange or, alternatively, during the step movement of the turntable 100 by way of an indexing device participating in the movement, or also at the location α.

In the following, a further version of the method according to the invention is explained, wherein on the one hand the locations α and γ and on the other hand the locations β and δ coincide with each other. The turntable 100 in this embodiment is equipped with two workpiece spindles 1, 2 that switch their mutual positions with a rotation of the turntable 100 by 180°. The reference symbols of the stations 10, 20 and 40 are the same as in FIG. 1. Station 10 performs the operations that were previously performed by the operating stations 10 and 30, in any event insofar as the machining of the flanks of the workpiece is concerned.

As is evident from the table in the lower half of FIG. 2, only two workpieces A, B can be in process simultaneously with this arrangement. The workpiece B installed on the workpiece spindle 2 is moved a first time to the processing position γ, then returned to the processing position β for the chamfering of the tooth edges, and subsequently moved again to the processing position γ with the secondary burrs on the end surfaces and on the flank side still in place, whereupon the material protrusions (secondary burrs) on the flank side are in this example removed likewise by hobbing (finishing pass). Concerning the removal of the end-facing secondary burrs, there are two different options to choose from. As a first possibility, the operating station 10 could be equipped with suitable shaving tools, or also suitable driven tools in the way of face-milling cutters. The tool carrier arrangement may have to be of a more massive construction in order to provide the necessary space for the face-milling tools without loss of stability and rigidity. In turn, this variation has the advantage that chips are produced only in the processing position γ and that no additional expensive measures nave to be taken at the processing position β for the removal of the chips.

In another configuration, the tools for the removal of the end-facing secondary burrs could also be placed at the operating station 20, and the end-facing secondary burrs could be removed after the return of the workpiece to the processing position β, i.e. before the workpiece is taken out. With this arrangement, there is again no risk that cold-hardened material that is cut away in the removal of the end-facing secondary burrs could be pressed back into the tooth edges as a result of the chamfering process, as the control sequence dictates a position change of the workpiece that has been chamfered but still carries the secondary burrs.

As indicated in the upper part of FIG. 2, the chamfering device (and, if applicable, the device for removing the end-facing secondary burr) can be moved into and out of the operating zone of the processing position β, while the workpiece-changing device 40 can likewise be moved into and out of this zone, so that these devices are not in each other's way as they perform their respective operations.

The variant described in FIG. 2 has the further advantage that the workpiece can also be machined on the flank side in a one-step generating operation. With this version of the method, after the first milling operation (milling out of the full) in the processing position γ and subsequent chamfering, the workpiece is not subjected to any further work in the processing position γ. Rather, the workpiece passes through this processing position only once and is taken off by the workpiece changer 40 after the chamfering and, if applicable, deburring. The operating station 20 could in this case be functionally expanded in order to also remove secondary burrs on the flank side, unless this step is not left to a further operating station that is not shown here.

Such an arrangement which is designed to perform the method of the invention is thus more versatile in its application because it additionally allows single-step milling, if desired. Furthermore, a good combination is achieved of short overall processing times and quality of the resultant gear profile because with two-step milling (rough milling—chamfering—fine milling), the workpiece which still carries the secondary burrs is switched from the chamfering position β to the milling position γ through a rotary movement of the turntable 100.

The invention claimed is:

1. A method of machining a first workpiece (A, B, C, D, E, F) having two end surfaces that are interconnected by a peripheral face, the peripheral face comprising a gear profile of a plurality of teeth, each tooth having tooth flank sides, the gear profile having been formed on the first workpiece by a chip-removing machining process, wherein the edge of one of the tooth flank sides at one of the end surfaces of the gear profile is changed by way of a plastic forming operation at a first location (β) into a chamfered edge, wherein material displaced in the plastic forming operation towards the end face of the gear profile gives rise to an end-facing material protrusion on the one end surface, while material displaced towards the one tooth flank side of the gear profile causes a material protrusion on the one flank side, and wherein the resulting material protrusions on the one end surface and on the one flank side are removed by said method, characterized in that the first workpiece, while still carrying the end-facing material protrusion, is switched to a second location (γ), where the removal of the material protrusion on the one flank side takes place.

2. The method according to claim 1, wherein the removal of the material protrusion on the one flank side is performed through a chip-cutting engagement of a machining tool.

3. The method according to claim 1, wherein the chip-removing machining process of forming the gear profile occurs at the second location (γ).

4. The method according to claim 3, wherein an infeed depth for the removal of the material protrusion on the one flank side is set equal to the deepest infeed used in the forming of the gear profile.

5. The method according to claim 3, wherein an infeed depth for the removal of the material protrusion on the one flank side is set deeper than the deepest infeed used in the forming of the gear profile.

6. The method according to claim 3 wherein the chip-removing machining process for forming the gear profile is a hobbing process.

7. The method according to claim 1 wherein the chip-removing machining process of forming the gear profile is performed by way of a chip-cutting engagement of a machining tool, said chip-cutting engagement being of the same kind as for the removal of the material protrusion on the one flank side and being performed with the same machining tool.

8. The method according to claim 1 wherein, at a third location (α, γ), the end-facing material protrusion is removed by being shaved off with a cutting tool or removed with a driven face-milling cutter.

9. The method according to claim 1 wherein the removal of the end-facing material protrusion is performed at the second location (γ) by shaving the end-facing material protrusion off with a cutting tool or removing the end-facing material protrusion with a driven face-milling cutter.

10. The method according to claim 1 wherein after the material protrusion on the one flank side has been removed, the first workpiece is moved to the first location, at which the first workpiece is taken out.

11. The method according to claim 10, wherein the removal of the end-facing material protrusion is performed at the first location as a last operation, prior to taking the first workpiece out, by shaving with a cutting tool or through a milling operation with a driven face-milling cutter.

12. The method according claim 10 wherein a space used by a device serving to take out the workpiece and/or to set a new workpiece in place overlaps with the space used by a device serving to remove the end-facing material protrusion.

13. The method according to claim 1 wherein in parallel with the plastic forming operation, a gear profile having a tooth edge that is to be reworked is generated on a second workpiece at a third location (α).

14. The method according to claim 13, wherein the same processing steps of changing by way of a plastic forming operation, at the first location, an edge of one of the tooth flank sides of at one of the end surfaces of the gear profile of the second workpiece into a chamfered edge, wherein material displaced in the plastic-forming operation towards the end face of the gear profile of the second workpiece gives rise to an end-facing material protrusion on the one end surface of the second workpiece, while material displaced towards the one tooth flank side of the gear profile of the second workpiece causes a material protrusion on the one flank side of the second workpiece, wherein the resulting material protrusions on the one end surface and on the one flank side of the second workpiece are removed, wherein the second workpiece, while still carrying the end-facing material protrusion, is switched to the second location, at which second location the removal of the material protrusion of the one flank side of the second workpiece takes place, are performed on said second workpiece with a time shift as compared to the first workpiece, and wherein a third workpiece is subjected to an operation at a fourth location (δ; β) while the second workpiece is at the second location (γ).

* * * * *